United States Patent
Nishio (10) Patent No.: US 9,590,380 B2
(45) Date of Patent: Mar. 7, 2017

(54) LASER OSCILLATOR PROVIDED WITH BLOWER

(71) Applicant: FANUC CORPORATION, Minamitsuru-gun, Yamanashi (JP)

(72) Inventor: Akihiko Nishio, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/040,121

(22) Filed: Feb. 10, 2016

(65) Prior Publication Data

US 2016/0240991 A1    Aug. 18, 2016

(30) Foreign Application Priority Data

Feb. 16, 2015    (JP) .................. 2015-028021

(51) Int. Cl.
| | |
|---|---|
| H01S 3/22 | (2006.01) |
| H01S 3/036 | (2006.01) |
| H01S 3/134 | (2006.01) |
| H01S 3/106 | (2006.01) |
| H01S 3/0943 | (2006.01) |
| H01S 3/104 | (2006.01) |
| H01S 3/041 | (2006.01) |

(52) U.S. Cl.
CPC ............ *H01S 3/036* (2013.01); *H01S 3/0943* (2013.01); *H01S 3/104* (2013.01); *H01S 3/1067* (2013.01); *H01S 3/134* (2013.01); *H01S 3/22* (2013.01); *H01S 3/041* (2013.01)

(58) Field of Classification Search
CPC .......... H01S 3/036; H01S 3/104; H01S 3/041; H01S 3/0943; H01S 3/134; H01S 3/22; H01S 3/1067

USPC ....................................... 372/58, 55
See application file for complete search history.

(56) References Cited

U.S. PATENT DOCUMENTS

| | | | | |
|---|---|---|---|---|
| 2011/0243177 A1* | 10/2011 | Nishio | .................... | H01S 3/036 372/58 |
| 2013/0315274 A1* | 11/2013 | Murakami | .............. | H01S 3/036 372/58 |
| 2016/0141823 A1* | 5/2016 | Nishio | .................... | H01S 3/036 372/38.02 |

FOREIGN PATENT DOCUMENTS

| | | |
|---|---|---|
| JP | 2011-228624 A | 11/2011 |
| JP | 2014165189 | 9/2014 |
| JP | 2014170885 | 9/2014 |

\* cited by examiner

*Primary Examiner* — Kinam Park
(74) *Attorney, Agent, or Firm* — RatnerPrestia (57) ABSTRACT

There was the problem that the pressure of the laser medium rises from the target value by the heat when generating laser light. The laser oscillator includes a controller, laser medium flow path, resonator part, blower, pressure detecting part, laser medium supply-exhaust part, and temporary stop command part. The controller controls the resonator part to stop to generate laser light if a temporary stop is commanded, controls the blower 18 to slow the rotational speed of the blower from the first rotational speed to the second rotational speed, and controls the laser medium supply-exhaust part so that the pressure is the second target value lower than the pressure at the time when the rotational speed of the blower is the second rotational speed.

3 Claims, 5 Drawing Sheets

LASER OSCILLATOR PROVIDED WITH BLOWER

BACKGROUND OF THE INVENTION

1. Field of the Invention

The invention relates to a laser oscillator which is provided with a blower.

2. Description of the Related Art

Known in the art is the art of controlling a pressure of a laser medium in a laser medium flow path of a laser oscillator when making operation of a laser oscillator temporarily stop (for example, Japanese Patent Publication No. 2011-228624A).

In the above-mentioned such prior art, there was the problem that when ending the temporary stop of the laser oscillator to start the generation of laser light, the pressure of the laser medium ended up rising from the pressure target value when generating laser light due to the effects of heat etc.

SUMMARY OF THE INVENTION

As an aspect of the invention, a laser oscillator comprises a controller, a laser medium flow path which forms a flow path of a laser medium, a resonator part which generate laser light by using the laser medium flowing through the laser medium flow path, and a blower which causes the laser medium to flow in the laser medium flow path.

Further, the laser oscillator comprises a pressure detecting part which detects a pressure of the laser medium in the laser medium flow path, a laser medium supply-exhaust part which supplies the laser medium to the laser medium flow path and which exhausts the laser medium from the laser medium flow path, and a temporary stop command part which commands a temporary stop for generating laser light by the resonator part to the controller.

Before the temporary stop command part commands the temporary stop, the controller controls the blower so as to rotate at a predetermined first rotational speed, and controls the laser medium supply-exhaust part so that the pressure is a first target value.

When the temporary stop command part commands the temporary stop, the controller controls the resonator part so as to stop to generate laser light, and controls the blower so as to decrease the rotational speed of the blower to a second rotational speed lower than the first rotational speed.

At this time, the controller also controls the laser medium supply-exhaust part so that the pressure is the second target value. The second target value is set to be lower than the pressure at the time when the rotational speed of the blower is the second rotational speed.

The second target value $P_2$ may be obtained by formula $P_2 = P_n - P_n \times \Delta P_a / P_1$. Here, $P_1$ is the first target value, $P_2$ is the second target value, $P_n$ is the pressure at the time the rotational speed of the blower is the second rotational speed, and $\Delta P_a$ is the pressure increment generated when the controller restarts the operation of the stopped resonator part. The second rotational speed may be zero.

DETAILED DESCRIPTION

Below, embodiments of the invention will be explained in detail based on the drawings. First, referring to FIG. 1 and FIG. 2, a laser oscillator 10 according to an embodiment of the invention will be explained.

Figure 1:
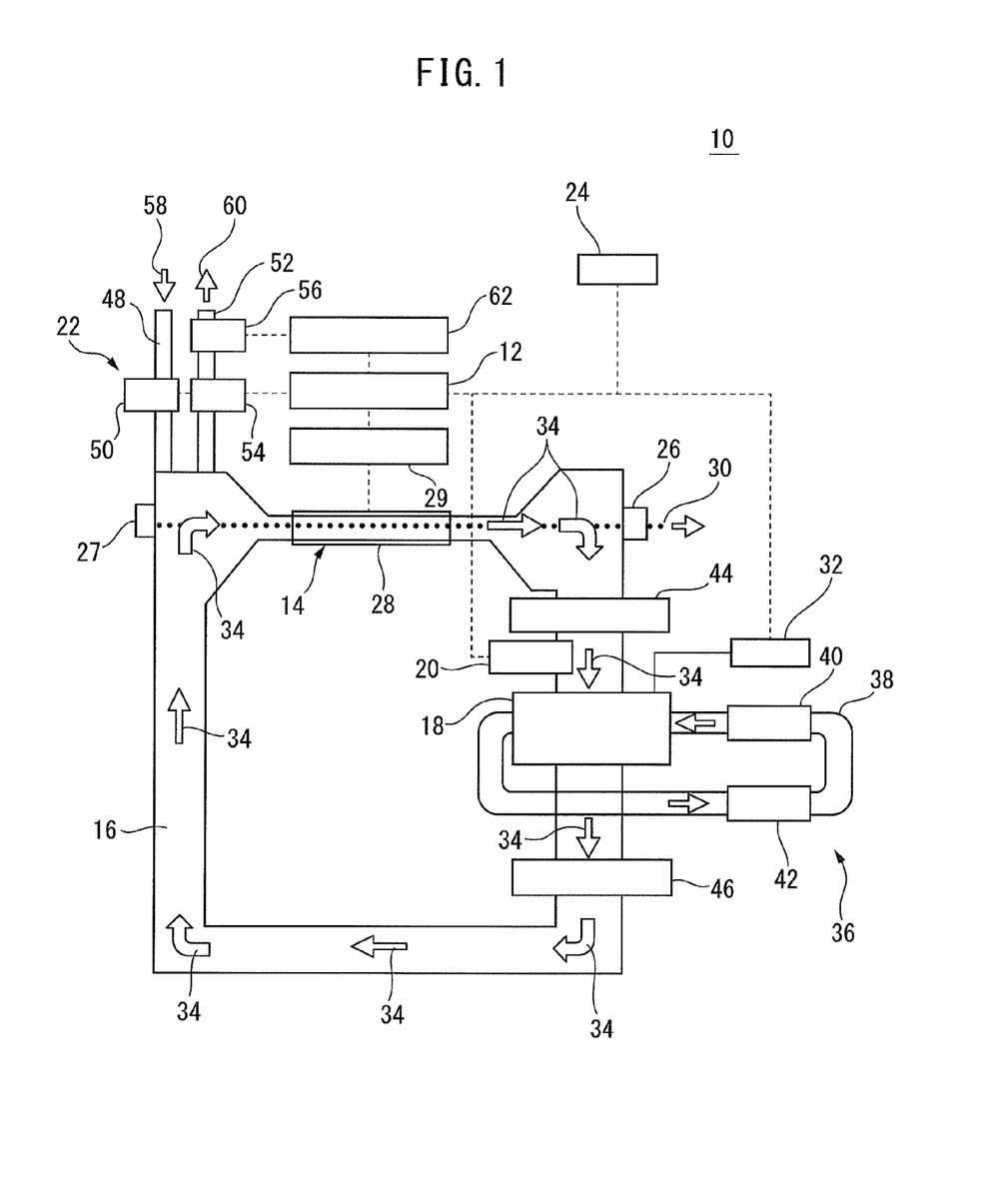
FIG. 1 is a view of a laser oscillator according to an embodiment of the invention.
Figure 2:
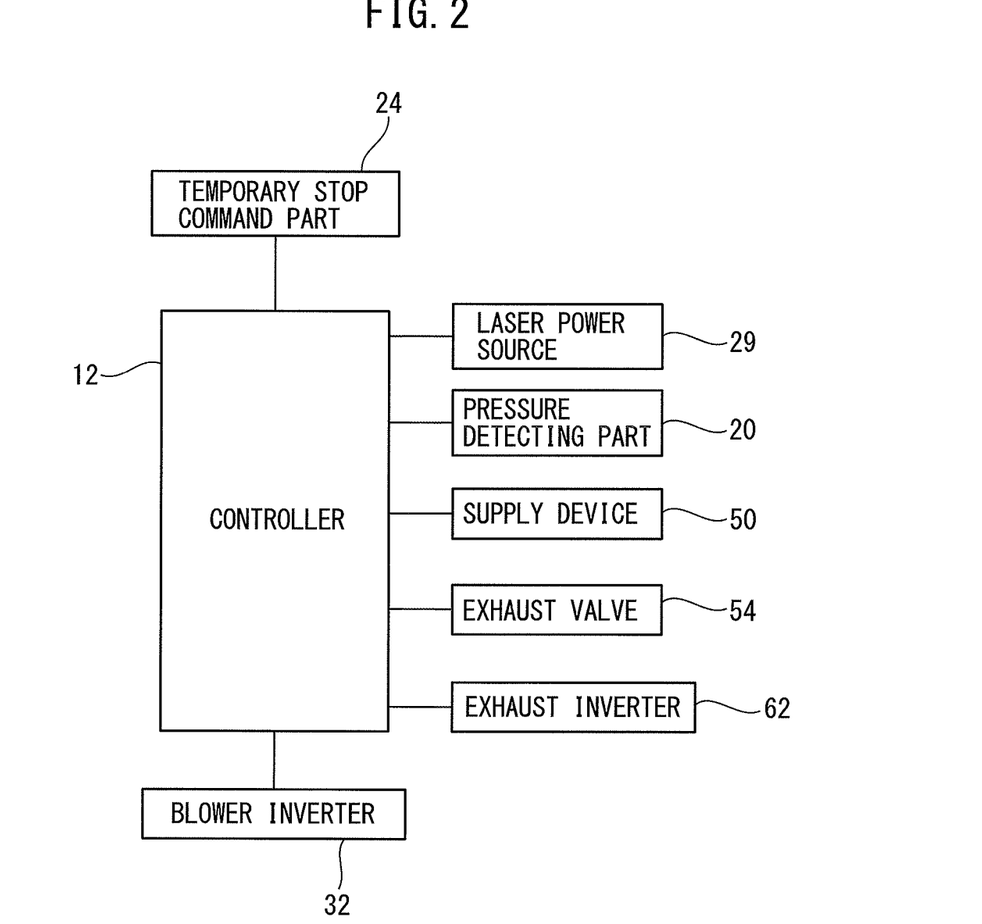
FIG. 2 is a block diagram of the laser oscillator shown in FIG. 1.

The laser oscillator 10 includes a controller 12, a resonator part 14, a laser medium flow path 16, a blower 18, a pressure detecting part 20, a laser medium supply-exhaust part 22, and a temporary stop command part 24. The controller 12 directly or indirectly controls each element of the laser oscillator 10.

The resonator part 14 generates laser light in accordance with a command from the controller 12. Specifically, the resonator part 14 includes an output mirror 26, a rear mirror 27, and a discharge tube 28. The output mirror 26 and the rear mirror 27 are arranged to be opposite to each other. The discharge tube 28 is a hollow component arranged between the output mirror 26 and rear mirror 27.

The output mirror 26 is comprised of a partial reflecting mirror (i.e., a half mirror) having a 99% or more reflectance. On the other hand, the rear mirror 27 is comprised of a full reflecting mirror. The inside of the discharge tube 28 is in fluid communication with the laser medium flow path 16.

The discharge tube 28 includes discharge electrodes (not shown) arranged to be opposite to each other. These discharge electrodes are electrically connected to a laser power source 29. The laser power source 29 applies voltage to the discharge electrodes in accordance with a command from the controller 12.

A laser medium such as carbon dioxide gas, nitrogen gas, or argon gas is supplied inside of the discharge tube 28. If the voltage is applied to the discharge electrodes, the laser medium is excited due to the electric discharge generated between the discharge electrodes, whereby laser light is generated. The laser light generated inside the discharge tube 28 is amplified due to optical resonance generated between the output mirror 26 and the rear mirror 27, and emitted outside via the output mirror 26 in the form of output laser light 30.

The laser medium flow path 16 is in fluid communication with the inside of the discharge tube 28, and forms a flow path of the laser medium flowing through the inside of the discharge tube 28. Specifically, the laser medium flow path 16 is comprised of a closed-loop flow path pipe which is connected to one end and the other end of the discharge tube 28. The laser medium is enclosed in the laser medium flow path 16.

The blower 18 is provided at a predetermined position in the laser medium flow path 16. Specifically, the blower 18 is comprised of e.g. a fan or blower, and includes a rotor having a plurality of vanes and a motor for rotating the rotor (both not shown).

A blower inverter 32 is connected to the blower 18. The blower inverter 32 supplies electric power to the blower 18 in accordance with a command from the controller 12. The blower 18 rotates the rotor thereof with the electric power supplied from the blower inverter 32.

Due to this, the blower 18 causes pressure fluctuations in the laser medium in the laser medium flow path 16, whereby causes the laser medium to flow in the direction indicated by the arrow 34 in FIG. 1. As a result, the laser medium is introduced into the discharge tube 28 through the laser medium flow path 16, passes through the inside of the discharge tube 28, and is exited from the discharge tube 28.

In order to prevent the blower 18 from being heated, a cooling device 36 is provided at the laser medium flow path 16. The cooling device 36 includes a coolant circulating device 40 for circulating a coolant in a cooling passage 38, and a coolant cooling device 42 for cooling the coolant.

The blower 18 is cooled by the coolant flowing in the cooling passage 38. For example, cooling water can be used as the coolant. The coolant circulating device 40 is comprised of e.g. a pump for pumping the coolant. On the other hand, the coolant cooling device 42 is comprised of e.g. a heat exchanger which exchanges heat with the air in order to cool the coolant.

A first heat exchanger 44 and a second heat exchanger 46 are respectively arranged at the upstream side and downstream side of the blower 18 in the laser medium flow path. A coolant (e.g., cooling water) is supplied to each of the first heat exchanger 44 and second heat exchanger 46. The laser medium is cooled by heat exchange with the coolant when passing through the first heat exchanger 44 and the second heat exchanger 46, and maintained at a predetermined temperature.

The pressure detecting part 20 is installed at a predetermined position in the laser medium flow path 16. In this embodiment, the pressure detecting part 20 is installed at the upstream side of the blower 18 and the downstream side of the discharge tube 28.

The pressure detecting part 20 includes e.g. a pressure sensor capable of measuring a pressure of a fluid such as a gas. The pressure detecting part 20 measures the pressure of the laser medium in the laser medium flow path 16 in accordance with a command from the controller 12, and sends data of the pressure to the controller 12.

The laser medium supply-exhaust part 22 supplies the laser medium to the laser medium flow path 16 and exhausts the laser medium from the laser medium flow path 16, in accordance with a command from the controller 12. Specifically, the laser medium supply-exhaust part 22 includes a supply flow path 48, a supply device 50, an exhaust flow path 52, an exhaust valve 54, and an exhaust device 56.

One end of the supply flow path 48 is connected to a tank (not shown) which stores the laser medium, while the other end of the supply flow path 48 is connected to the laser medium flow path 16 at the upstream side of the discharge tube 28. The inner pressure of the tank is maintained to be higher than that of the laser medium flow path 16.

The supply device 50 is provided at the supply flow path 48. The supply device 50 is comprised of a valve capable of opening and closing the supply flow path 48, such as a variable valve which changes the opening area of the supply flow path 48. The supply device 50 opens and closes the supply flow path 48 in accordance with a command from the controller 12. If the supply device 50 opens the supply flow path 48, the laser medium stored in the tank is supplied to the laser medium flow path 16 through the supply flow path 48, as indicated by the arrow 58.

One end of the exhaust flow path 52 is arranged in e.g. an outside air, while the other end of the exhaust flow path 52 is connected to the laser medium flow path 16 at the upstream side of the discharge tube 28. The exhaust valve 54 and exhaust device 56 are provided at the exhaust flow path 52.

The exhaust valve 54 is comprised of e.g. a valve capable of opening and closing the exhaust flow path 52, such as a variable valve which changes the opening area of the exhaust flow path 52. The exhaust device 56 is comprised of e.g. a fan which takes in the laser medium from the laser medium flow path 16, and exhausts it from the laser medium flow path 16 through the exhaust flow path 52, as indicated by the arrow 60.

The exhaust device 56 is electrically connected to the exhaust inverter 62, and driven by electric power supplied through the exhaust inverter 62. It is possible to exhaust the laser medium from the laser medium flow path 16 in response to the drive power (or rotational speed) of the exhaust device 56 and the degree of opening of the exhaust valve 54.

The temporary stop command part 24 receives from the user a command for temporarily stopping the generation of laser light in the resonator part 14, and sends a temporary stop command to the controller 12. As an example, the temporary stop command part 24 includes a pushbutton-type switch. In this case, the temporary stop command part 24 sends the temporary stop command to the controller 12 when the user pushes the switch.

As another example, the temporary stop command part 24 may be built in an external device, such as a PC, which is connected to the controller 12. In this case, the user operates the external device so as to input a temporary stop command. The temporary stop command part 24 sends the temporary stop command input by the user to the controller 12.

As still another example, the temporary stop command part 24 may be built in a host controller connected to the controller 12. In this case, the temporary stop command part 24 receives a temporary stop command from the host controller, and sends it to the controller 12.

Figure 3:
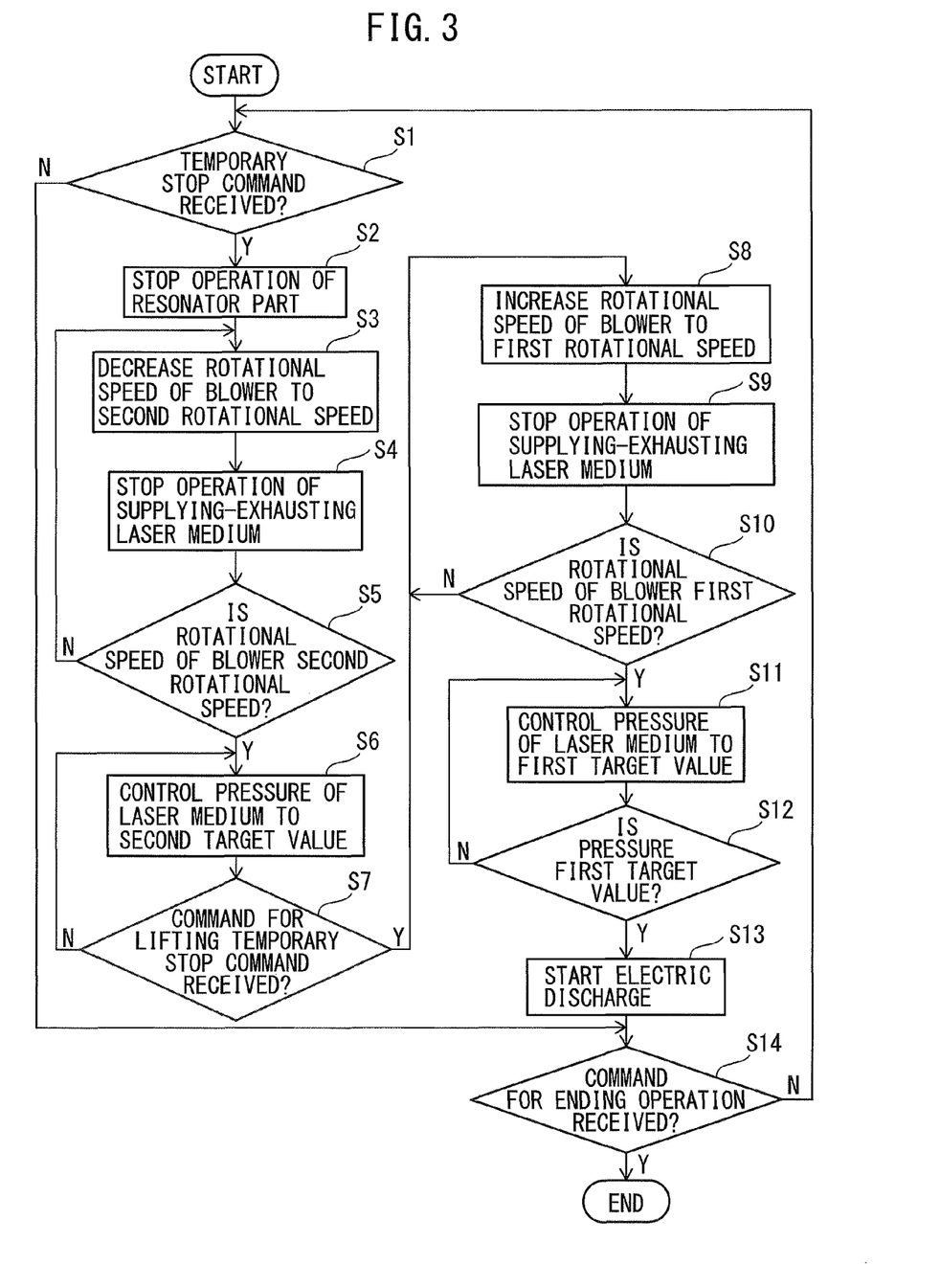
FIG. 3 is a flow chart showing an example of an operation flow of the laser oscillator shown in FIG. 1.

Next, referring to FIG. 1 to FIG. 3, the operation of the laser oscillator 10 will be explained. FIG. 3 is a flow chart which shows an example of the operation flow of the laser oscillator 10. The flow shown in FIG. 3 starts when the controller 12 receives an operating command for the laser oscillator 10 from the user or host controller and the laser oscillator 10 is transitioned to a normal operating mode.

In this normal operating mode, the controller 12 controls the motor built in the blower 18 so that the rotor of the blower 18 rotates at a predetermined first rotational speed $R_1$. In addition, the controller 12 controls the laser medium supply-exhaust part 22 so that the pressure P in the laser medium flow path 16 is a predetermined first target value $P_1$.

Specifically, the controller 12 controls the supply device 50, exhaust valve 54, and exhaust device 56 by a feedback control in response to the pressure value obtained from the pressure detecting part 20, so as to control the pressure P in the laser medium flow path 16 to the first target value $P_1$.

Thus, in this embodiment, the pressure P at the position where the pressure detecting part 20 in the laser medium flow path 16 is installed (i.e., the position at upstream side of the blower 18) is controlled so as to be the first target value $P_1$.

Then, the controller 12 sends a command to the laser power source 29 so as to apply voltage to the discharge electrodes provided at the discharge tube 28. Due to this, the resonator part 14 generates laser light and emits the output laser light 30 from the output mirror 26. In this way, the laser oscillator 10 is transitioned to the normal operating mode.

After starting the flow shown in FIG. 3, at step S1, the controller 12 determines whether the temporary stop command from the temporary stop command part 24 has been received. When it is determined that the controller 12 has received the temporary stop command (i.e., determined "YES"), the controller 12 proceeds to step S2. On the other hand, when it is determined that the controller 12 has not received the temporary stop command (i.e., determined "NO"), the controller 12 proceeds to step S14.

At step S2, the controller 12 controls the resonator part 14 so as to stop the operation of generating laser light. Specifically, the controller 12 controls the laser power source 29 so as to stop to apply voltage to the discharge electrodes provided at the discharge tube 28. As a result, the operation of generating laser light in the resonator part 14 is stopped.

At step S3, the controller 12 controls the blower 18 so as to decrease the rotational speed R of the blower 18 to a second rotational speed $R_2$ smaller than the first rotational speed $R_1$. As an example, the second rotational speed $R_2$ is set to zero (i.e., $R_2=0$).

In this case, the controller 12 sends a command to the blower inverter 32 so as to stop the electric power to be supplied to the motor of the blower 18 from the blower inverter 32. As a result, the rotational speed of the blower 18 gradually decreases until reaching zero.

At step S4, the controller 12 stops the operation of supplying-exhausting the laser medium by the laser medium supply-exhaust part 22. Specifically, the controller 12 sends commands to the supply device 50 and exhaust valve 54 so as to close the valve of the supply device 50 and exhaust valve 54. Thus, the supply flow path 48 and exhaust flow path 52 are closed. In addition, the controller 12 sends a command to the exhaust inverter 62 so as to stop the operation of the exhaust device 56.

This step S4 is executed in view of the following matter. Specifically, the blower 18 does not immediately decelerate to the second rotational speed $R_2$ after starting step S3. In contrast, as explained above, the blower 18 gradually decelerates over a certain period of time until becoming the second rotational speed $R_2$ (e.g., until the stop of rotation).

During the rotational speed R of the blower 18 decreases in this way, the pressure P in the laser medium flow path 16 does not stabilize. In view of this, at this step S4, the controller 12 stops the operation of supplying-exhausting the laser medium until the rotational speed R of the blower 18 is stable.

At step S5, the controller 12 determines whether the rotational speed R of the blower 18 is the second rotational speed $R_2$. As an example, the controller 12 monitors the feedback value (e.g., feedback current, or load torque) from the blower inverter 32. When the feedback value is within a range between predetermined threshold values, the controller 12 determines that the rotational speed R of the blower 18 is the second rotational speed $R_2$.

In this case, a correlation between the rotational speed R of the blower 18 and the feedback value from the blower inverter 32 is recorded in advance. The controller 12 compares the feedback value from the blower inverter 32 with the pre-recorded correlation, and determines whether the rotational speed R of the blower 18 is the second rotational speed $R_2$.

As another example, the controller 12 may determine whether a predetermined time $\tau_1$ has elapsed after carrying out step S3, thereby determine whether the rotational speed R of the blower 18 is the second rotational speed $R_2$.

In this case, a correlation between the rotational speed R of the blower 18 and the elapsed time $\tau_1$ is recorded in advance. The controller 12 compares the elapsed time $\tau_2$ with the correlation, and determines whether the rotational speed R of the blower 18 is the second rotational speed $R_2$.

The blower inverter 32 may operate in accordance with a predetermined operating program. In this case, it is possible to obtain the correlation between the rotational speed R of the blower 18 and the elapsed time $\tau$ from the operating program.

When it is determined that the rotational speed R of the blower 18 is the second rotational speed $R_2$ (i.e., determined "YES"), the controller 12 proceeds to step S6. On the other hand, when it is determined that the rotational speed R is not the second rotational speed $R_2$ (i.e., determined "NO"), the controller 12 returns to step S3.

At step S6, the controller 12 controls the pressure P in the laser medium flow path 16 to the second target value $P_2$. Specifically, the controller 12 controls the supply device 50, exhaust valve 54, and exhaust device 56 by a feedback control in response to the pressure value obtained from the pressure detecting part 20, so as to control the pressure P in the laser medium flow path 16 to the second target value $P_2$.

In this embodiment, the second target value $P_2$ is set to be lower than the pressure $P_n$ of the laser medium at the time when the rotational speed R of the blower 18 is the second rotational speed R2 (i.e., when determined "YES" at step S5). As an example, the second target value $P_2$ is defined as shown in the following formula 1:

$$P_2 = P_n - P_n \times \Delta P_a / P_1 \qquad \text{(formula 1)}$$

Here, $P_1$ is the first target value, $P_n$ is the pressure of the laser medium when determined "YES" at step S5, and $\Delta P_a$ is a pressure increment. Note that, the pressure increment $\Delta P_a$ will be explained later.

At step S7, the controller 12 determines whether it has received a command for lifting the temporary stop command which has been received from the temporary stop command part 24 at step S1. For example, when the temporary stop command part 24 includes the pushbutton-type switch, the user operates the switch to release it from being pushed in.

If the temporary stop command part 24 detects that the switch is released from being pushed-in, the temporary stop command part 24 sends a push-in release signal to the controller 12. When having received the push-in release signal, the controller 12 determines that it has received a command for lifting the temporary stop command from the user (i.e., determines "YES").

When it is determined that the controller 12 has received the command for lifting the temporary stop command, the controller 12 proceeds to step S8. On the other hand, when it is determined that the controller 12 has not received the command for lifting the temporary stop command (i.e., determined "NO"), the controller 12 returns to step S6.

At step S8, the controller 12 controls the blower 18 so as to increase the rotational speed R of the blower 18 from the second rotational speed $R_2$ to the first rotational speed $R_1$. For example, when the rotational speed $R_2$ is set to zero (i.e., $R_2=0$), the controller 12 sends a command to the blower inverter 32 so as to restart the supply of electric power from the blower inverter 32 to the blower 18. As a result, the rotational speed R of the blower 18 is gradually increased until reaching the first rotational speed $R_1$.

At step S9, the controller 12 stops the supply-exhaust operation of the laser medium by the laser medium supply-exhaust part 22, in the same way as the above-mentioned step S4. Specifically, the controller 12 controls the supply device 50, exhaust valve 54, and exhaust inverter 62 so as to stop the supply-exhaust operation of the laser medium.

At step S10, the controller 12 determines whether the rotational speed R of the blower 18 is the first rotational speed $R_1$. As an example, the controller 12 monitors the feedback value (e.g., feedback current and load torque) from the blower inverter 32. When the feedback is within a range between predetermined threshold values, the controller 12 determines that the rotational speed R of the blower 18 is the first rotational speed $R_1$.

As another example, the controller 12 determines whether or not a predetermined time $\tau_2$ has elapsed after carrying out step S8, thereby determines whether or not the rotational speed R of the blower 18 is the first rotational speed $R_1$.

In this case, a correlation between the rotational speed R of the blower 18 and the elapsed time $\tau_2$ is recorded in advance. The controller 12 may compare the elapsed time $\tau_2$ with the correlation, and determine whether or not the rotational speed R of the blower 18 is the first rotational speed $R_1$.

When it is determined that the rotational speed R of the blower 18 is the first rotational speed $R_1$ (i.e., determined "YES"), the controller 12 proceeds to step S11. On the other hand, when it is determined that the rotational speed R is not the first rotational speed $R_1$ (i.e., determined "NO"), the controller 12 returns to step S8.

At step S11, the controller 12 controls the pressure P in the laser medium flow path 16 to the first target value $P_1$. Specifically, the controller 12 controls the supply device 50, exhaust valve 54, and exhaust device 56 by a feedback control in response to the pressure value obtained from the pressure detecting part 20, so as to control the pressure P in the laser medium flow path 16 to the first target value $P_1$.

At step S12, the controller 12 determines whether or not the pressure P in the laser medium flow path 16 is the first target value $P_1$. Specifically, the controller 12 determines whether or not the pressure value obtained from the pressure detecting part 20 is the first target value $P_1$.

When it is determined that the pressure P in the laser medium flow path 16 is the first target value $P_1$ (i.e., determined "YES"), the controller 12 proceeds to step S13. On the other hand, when it is determined that the pressure P in the laser medium flow path 16 does not become the first target value $P_1$ (i.e., determined "NO"), the controller 12 returns to step S11.

At step S13, the controller 12 operates the resonator part 14 so as to start an electric discharge therein. Specifically, the controller 12 sends a command to the laser power source 29 so as to apply voltage to the discharge electrodes provided at the discharge tube 28. Due to this, an electric discharge occurs in the discharge tube 28, thereby laser light is generated.

At step S14, the controller 12 determines whether or not a command for ending the operation of the laser oscillator 10 has been received. As an example, the controller 12 determines that it has received a command for ending the operation of the laser oscillator 10 (i.e., determines "YES"), when having received from the user or a host controller an instruction indicating that all of the processes (e.g., laser processing on the workpiece) to be executed by the laser oscillator 10 have been completed.

When the controller 12 determines that it has received the command for ending the operation of the laser oscillator 10, the controller 12 ends the flow shown in FIG. 3. On the other hand, when the controller 12 determines that it has not received the command for ending the operation of the laser oscillator 10 (i.e., determines "NO"), it returns to step S1.

As explained above, in this embodiment, the second target value $P_2$ is set to be lower than the pressure $P_n$ of the laser medium at the time when determined "YES" at step S5. The technical significance of this feature will be explained with reference to FIG. 4 to FIG. 6.

Figure 4:
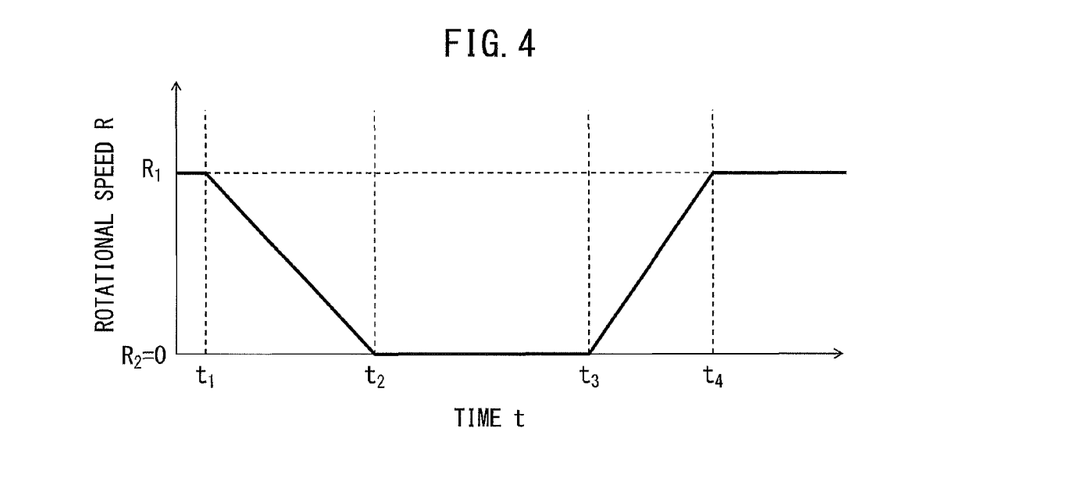
FIG. 4 is a graph showing the relationship between time "t" and rotational speed "R" of the blower.

FIG. 4 is a graph showing the relationship between the time "t" and the rotational speed R of the blower 18 during carrying out the above-mentioned steps S1 to S13. Note that, FIG. 4 shows a case where the rotational speed $R_2$ is set to zero.

Figure 5:
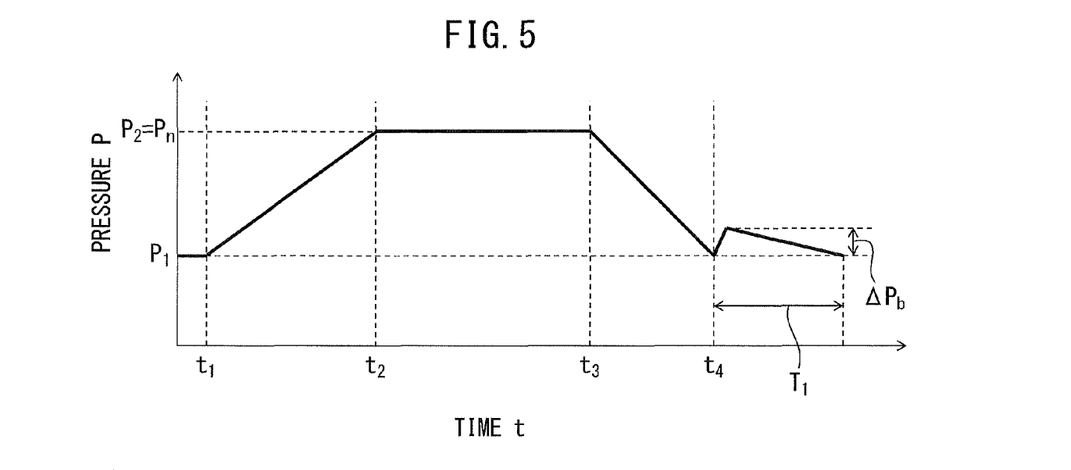
FIG. 5 is a graph showing the relationship between time "t" and pressure "P" of the laser medium when setting the second target value $P_2$ to the pressure $P_n$ at the time when judging "YES" at step S5 in FIG. 3.

FIG. 5 is a graph showing the relationship between the time "t" and the pressure P of the laser medium while carrying out steps S1 to S13, when the second target value $P_2$ is set to the pressure $P_n$ at the time when determined "YES" at step S5.

Figure 6:
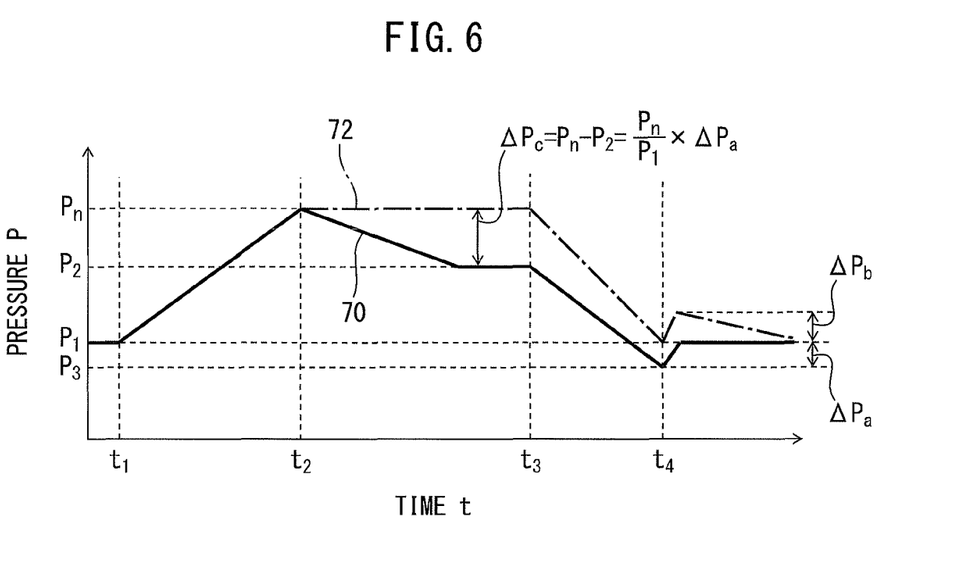
FIG. 6 is a graph showing the relationship between time "t" and pressure "P" of the laser medium when setting the second target value $P_2$ to be lower than the pressure $P_n$ at the time when judging "YES" at step S5 in FIG. 3.

FIG. 6 is a graph showing the relationship between the time "t" and the pressure P of the laser medium while carrying out steps S1 to S13, when the second target value $P_2$ is set to be lower than the pressure $P_n$ at the time when determined "YES" at step S5.

The times $t_1$, $t_2$, $t_3$, and $t_4$ in FIG. 4 to FIG. 6 respectively correspond to the point of time when the above-mentioned step S3 is started, the point of time when it is determined "YES" at step S5, the point of time when step S8 is started, and the point of time when step S13 is started. As shown in FIG. 4, after the start of step S3, the rotational speed R of the blower 18 gradually decreases from the time $t_1$, and reaches the second rotational speed $R_2(=0)$ at the time $t_2$.

As the rotational speed R of the blower 18 decreases in this way, the pressure P at the position of the upstream side of the blower 18 in the laser medium flow path 16 gradually increases from the pressure $P_1$, as shown in FIG. 5 and FIG. 6. Then, the pressure P reaches the pressure $P_n(>P_1)$ at the time $t_2$.

Firstly, considering a case where the pressure P is controlled to the pressure $P_n$ during the time period from the time $t_2$ to the time $t_3$ (i.e., the time period of temporary stop) as shown in FIG. 5. In this case, when step S8 is started at the time $t_3$ and the rotational speed R of the blower 18 is accelerated from the second rotational speed $R_2(=0)$, the pressure P decreases inversely proportional to the rotational speed R.

Then, when step S13 is started at the time $t_4$ and the discharge in the resonator part 14 is carried out, the temperature of the laser medium increases due to the discharge, as a result of which the pressure P of the laser medium increases as indicated by $\Delta P_b$ in FIG. 5.

If the pressure increment $\Delta P_b$ occurs in this way, it is necessary to additionally control the pressure P to the first target value $P_1$, thereby a time period $T_1$ should be taken until the pressure P is stabilized at the first target value $P_1$. Further, in order to cancel the pressure increment $\Delta P_b$, it is necessary to exhaust the laser medium from the laser medium flow path 16 so as to lower the pressure P, so the laser medium should be wasted.

In order to overcome the defects derived from the pressure increment $\Delta P_b$, in this embodiment, the pressure P in the laser medium flow path 16 is controlled to the second target value $P_2$ lower than the pressure $P_n$, during the time period of temporary stop from the time $t_2$ to the time $t_3$.

Below, referring to FIG. 6, the change in the pressure P in this embodiment will be explained. Note that, in FIG. 6, for comparison, the graph of the pressure P according to this embodiment is indicated by the solid line 70, while the graph shown in FIG. 5 is indicated by the one-dot chain line 72.

During the time period of temporary stop from the time $t_2$ to the time $t_3$, at step S6, the controller 12 controls the laser medium supply-exhaust part 22 so as to reduce the pressure P to the second target value $P_2$ from the pressure $P_n$.

Then, step S8 is started at the time $t_3$. As the rotational speed R of the blower 18 increases from the time $t_3$, the pressure P decreases inversely proportionally to the rotational speed R, and reaches a pressure $P_3$, which is lower than the first target value $P_1$ by a value $\Delta P_a$, at the time $t_4$.

The value $\Delta P_a$ corresponds to a pressure increment due to an increase in temperature of the laser medium derived from the electric discharge when starting step S13 at the time $t_4$. This pressure increment $\Delta P_a$ can be estimated by an experimental method, theory, or simulation, etc. Further, the second target value $P_2$ is defined by the pressure $P_n$, first target value $P_1$, and pressure increment $\Delta P_a$, as shown in the above-mentioned formula 1.

In this embodiment, by controlling the pressure P to the second target value $P_2$ during the time period of temporary stop, even if the pressure P increases by the pressure increment $\Delta P_a$ after the start of electric discharge, the increased pressure P can be made to be closer to the first target value $P_1$. Accordingly, it is possible to quickly control the pressure P to the second target value $P_2$.

Further, according to this embodiment, by making the pressure P after the start of electric discharge closer to the second target value $P_2$, it is possible to make the laser power and beam mode of the laser light more accurate and stable with little change along with time.

Further, according to this embodiment, the operation of the resonator part 14 is temporarily stopped so as to stop the generation of laser light, while the rotation of the blower 18 is stopped. Therefore, it is possible to reduce the power consumption in the laser oscillator 10.

Note that, in the above embodiment, the second target value $P_2$ is defined in accordance with formula 1, and is set to be larger than the first target value $P_1$. However, the second target value $P_2$ may be at least a value lower than the pressure $P_n$, and may be set to a value substantially the same as the first target value $P_1$.

Further, in the above embodiment, the controller 12 determines the rotational speed R of the blower 18 based on the feedback value from the blower inverter 32 or elapsed time τ at step S5 and S10.

However, a rotation detector capable of measuring the rotational speed of the blower 18, such as an encoder, may be provided at the blower 18. In this case, the controller 12 may determine the rotational speed of the blower 18 based on an output signal from the rotation detector.

Above, embodiments of the invention were used to explain the invention, but the above embodiments do not limit the inventions according to the claims. Further, combinations of the features which are explained in the embodiments of the invention may also be included in the technical scope of the invention. However, not all of the combinations of these features are necessarily essential for the solution of the invention. Further, the fact that the above embodiments can be changed or improved in various ways would be clear to a person skilled in the art.

Further, it should be noted that the operations, routines, steps, stages, and other processing in the device, system, program, and method in the claims, specification, and drawings, unless particularly clearly indicated by "before", "in advance of", etc. or the output of prior processing being used for later processing, can be realized in any order. In the flow of operations in the claims, specification, and drawings, even if explained using "first", "next", "then", etc. for convenience, this does not mean the execution in this order is essential.

The invention claimed is:

1. A laser oscillator comprising:
   a controller;
   a laser medium flow path which forms a flow path of a laser medium;
   a resonator part which generates laser light by using the laser medium flowing through the laser medium flow path;
   a blower which causes the laser medium to flow in the laser medium flow path;
   a pressure detecting part which detects a pressure of the laser medium in the laser medium flow path;
   a laser medium supply-exhaust part which supplies the laser medium to the laser medium flow path and which discharges the laser medium from the laser medium flow path; and
   a temporary stop command part which commands a temporary stop for generating laser light by the resonator part to the controller; wherein
   before the temporary stop command part commands the temporary stop, the controller controls the blower so as to rotate at a predetermined first rotational speed, and controls the laser medium supply-exhaust part so that the pressure is a first target value,
   when the temporary stop command part commands the temporary stop, the controller controls the resonator part so as to stop to generate laser light, controls the blower so as to decrease the rotational speed of the blower to a second rotational speed lower than the first rotational speed, and controls the laser medium supply-exhaust part so that the pressure is a second target value lower than the pressure at the time when the rotational speed of the blower is the second rotational speed.

2. The laser oscillator according to claim 1, wherein if the first target value is $P_1$, the second target value is $P_2$, the pressure at the time when the rotational speed of the blower is the second rotational speed is $P_n$, and the pressure increment generated when the controller restarts the operation of the stopped resonator part is $\Delta P_a$, the second target value $P_2$ is obtained by formula $P_2 = P_n - P_n \times \Delta P_a / P_1$.

3. The laser oscillator according to claim 1, wherein the second rotational speed is zero.

* * * * *